United States Patent
Gilger

[19]

[11] Patent Number: 6,150,995
[45] Date of Patent: Nov. 21, 2000

[54] COMBINED PHOTOVOLTAIC ARRAY AND RF REFLECTOR

[75] Inventor: L. Dwight Gilger, Torrance, Calif.

[73] Assignee: TRW Inc., Redondo Beach, Calif.

[21] Appl. No.: 09/148,130

[22] Filed: Sep. 4, 1998

[51] Int. Cl.[7] ........................................... H01Q 15/20
[52] U.S. Cl. ..................... 343/915; 343/881; 136/243
[58] Field of Search ................................. 343/912, 915, 343/880, 882, 881, DIG. 2; 136/243, 245; 359/853; 244/173, 158 R

[56] References Cited

U.S. PATENT DOCUMENTS

| | | | |
|---|---|---|---|
| 4,380,013 | 4/1983 | Slysh .......................................... | 343/753 |
| 4,475,323 | 10/1984 | Schwartzberg et al. ................... | 52/111 |
| 5,104,211 | 4/1992 | Schumacher ............................. | 343/915 |
| 6,028,570 | 2/2000 | Gilger et al. ............................. | 343/915 |

*Primary Examiner*—Tan Ho
*Attorney, Agent, or Firm*—Michael S. Yatsko; Ronald M. Goldman

[57] ABSTRACT

A new combination is formed of a deployable solar array and a deployable perimeter truss reflector within a single structure, defining a deployable perimeter truss reflector and solar array combination. In that combination the pliant reflective mesh, which serves as the RF reflector, is located at one circular end of the perimeter truss and the solar array is located at the other end. The solar array is formed with photovoltaic cells formed on both sides of a pliant film base. The photovoltaic cells are exposed to sunlight, either directly, or through the mesh, which is eighty percent porous to sunlight. Constructed in deployed form, for storage the truss contracts to the conventional non-deployed condition of a barrel-like configuration; and both the pliant reflective mesh that forms the reflector and the pliant base supporting the photovoltaic cells become tucked in place inside opposite ends of the barrel. Among other benefits, the integral structure obviates the complications resulting from use of two structures, such as shadowing, and eliminates the need for sun-tracking electronic systems used with prior solar arrays.

7 Claims, 2 Drawing Sheets

COMBINED PHOTOVOLTAIC ARRAY AND RF REFLECTOR

FIELD OF THE INVENTION

This invention relates to foldable perimeter truss antennas and to foldable solar arrays found in spacecraft application, and, more particularly, to a new combination that combines both an RF reflector and a solar array within a single foldable structure.

BACKGROUND

A spacecraft carries a large quantity of electronic equipment on its mission in space. Included amongst that equipment is an RF reflector, typically used as an antenna in the RF communication system, and a solar array, that is used to convert sunlight to electrical power for recharging the spacecraft's storage batteries. The RF reflector is deployable, that is, it folds up into a small package, occupying the smallest volume technologically possible within the spacecraft's precious cargo hold; and, upon command, unfolds to cover a very large area when the space craft is positioned in orbit. Likewise the solar array, formed of photovoltaic cells, is similarly deployable. When deployed, the stowed solar array also unfolds the solar panels which spread over a wide area. As those skilled in the art appreciate, those deployable structures are expensive to manufacture and contributes to the high cost to the space mission.

When large structures such as large deploying reflectors and large area solar arrays share the same spacecraft, they must be properly positioned as deployed so as to avoid shadowing one another. Otherwise the reflector could block some of the sunlight from reaching the photovoltaic cells within the array, reducing electrical performance. Conversely, the structure of the solar array would interfere with passage of RF radiation from and to the reflector, reducing the antenna's performance. To avoid such shadowing, the two structures must be carefully positioned. Many times careful positioning requires additional deployment devices, such as, as example, deployment booms. Those additional deployment devices add weight and necessarily take up precious cargo space on board the spacecraft.

The elimination of deployment booms or other supplementary deployment devices offers a decided advantage for the mission. For one, the weight launch can be reduced, thereby reducing fuel requirements. But, more importantly, the savings in weight and volume can be used for other equipment important to the mission or that increases the number of mission tasks that can be performed during the course of the mission.

Further, should it be possible to integrate the structure of the solar array within the structure of the reflector, then even greater efficiencies accrue. The launch weight for the RF reflector and solar arrays is reduced in weight and storage volume, a decided advantage. And, importantly, the construction cost for a foldable structure should fall, since it is necessary to construct and adjust only a single support structure, instead of two separate ones. By reason of that integration the booms and other additional deployment devices used in the past for the RF reflector and/or solar array should become unnecessary. The present invention offers such integration.

Accordingly, a principal abject of the present invention is to integrate an RF reflector and a solar array into a single deployable structure.

A further object of the invention is to reduce the combined weight and size required in total by use of both an RF reflector and a solar array.

A subsidiary object of the invention is to eliminate deployment booms and other such supplementary deployment devices required in the past in connection with the deployment of both an RF reflector and a solar array on board a spacecraft.

The present invention takes advantage of a particular deployable RF reflector referred to as a foldable perimeter truss reflector. In the foldable perimeter truss reflector, RF reflective material is supported upon a truss, a framework of tubing and fittings that collectively form, as deployed, a short hollow three dimensional surface, such as a cylinder, often referred to as a hoop. The reflective material covers and lies over a circular end of that hollow cylinder, vaguely resembling a sagging drum head. The reflective material is a pliant reflective cloth-like fabric typically constructed of a cross hatch of wires welded together at the intersections or knitted gold plated molybdenum wire. It is light weight and pliant in nature, so it may be compacted as part of the stowed package. When the RF reflector is deployed, the fabric is stretched out on an end of the truss to form a parabolic curved surface.

To support and profile the shape of the pliant reflective mesh material, lines, referred to as caternaries, are strung from the periphery of the cylinder across the end and collectively define a parabolic surface shape. The reflective material is tied to those catenaries. It is pulled into the parabolic shape defined by those catenaries.

In the deployed condition as assembled, the foregoing cylindrical truss structure folds up for storage on board the space craft by collapsing inwardly toward the center, its various structural tubes and pivotal joints moving in unison in carefully orchestrated complex movements as the structure collapses inwardly, together with the accompanying reflective material, and culminates in an elongate cylindrical package that occupies only a small fraction of the space earlier occupied and is the non-deployed or stowed state.

The foregoing description only briefly describes the complex truss structure and its complex folding operation since they are already known to those skilled in the antenna art of that kind, and those details are not necessary to the understanding of the present invention and need not be presented here. The construction details for same are difficult even for those skilled in the art to use language to describe. For those readers unfamiliar with the subject it is believed impossible to visualize. For the interested reader, examples of such perimeter truss reflectors are found in the patent literature, such as U.S. Pat. No. 5,680,145 granted Oct. 21, 1997 to Thomson et al, assigned to Astro Aerospace Corp. A more comprehensive example is described in the application to Gilger and Parker, Ser. No. 09/080,767 filed May 18, 1998 now U.S. Pat. No. 6,028,570, entitled Folding Perimeter Truss Reflector, currently pending. The interested reader may refer to the foregoing patent literature for additional details of a foldable perimeter truss structure.

Photovoltaic arrays contain large numbers of photovoltaic cells, sometimes referred to as solar cells. The deployable array contains a plurality of solar panels that are joined together, may be folded up for stowage, and, upon command, may be unfurled for deployment. Each photovoltaic cell converts the energy in incident sunlight into electricity. The solar cells are arranged in series circuits and those series circuits are connected in parallel for the purpose of providing combining the outputs of each cell to collectively provide the appropriate levels of current at a sufficiently high voltage suitable for charging the DC batteries used on board the spacecraft.

The solar cells are formed of semiconductor material and have been formed on a thin pliant flexible film base that forms the support. That flexibility or pliancy thereby permits construction of deployable solar arrays. As in the case of the RF reflector, it is not necessary to describe those solar array construction details in the present specification, since they are not necessary to the understanding of the present combination invention and are known to those skilled in that field of endeavor. The interested reader is referred to the technical and patent literature for those details.

SUMMARY OF THE INVENTION

In accordance with the foregoing objects and advantages, a solar array is mounted to one end of a foldable perimeter truss and a reflective mesh is mounted to the opposite end of that truss, providing both devices in a unitary assembly. The foregoing structure occupies a storage space that is at most slightly larger that the folding perimeter truss reflector alone, and substantially less storage space than do separate solar array and reflector apparatus.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DESCRIPTION OF THE PREFERRED EMBODIMENTS

Figure 1:
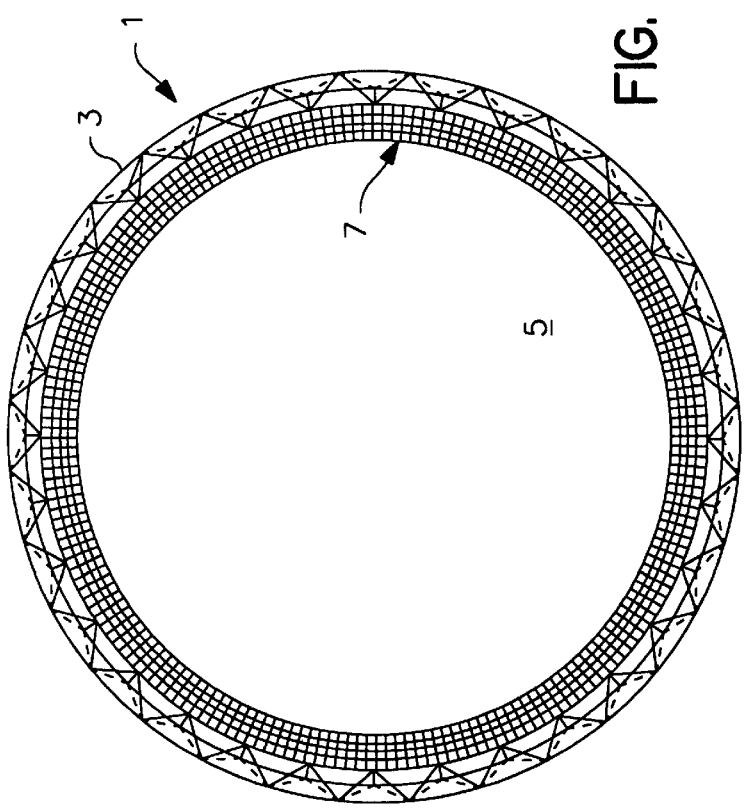
FIG. 1 is a top view of the solar array and RF reflector combination.
Figure 2:
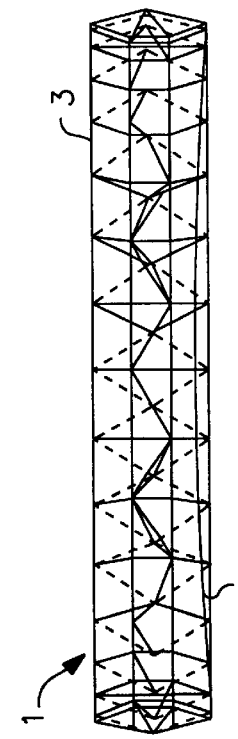
FIG. 2 is a side view of FIG. 1.

Reference is made to FIGS. 1 and 2 which diagrammatically illustrate the new combination 1 in rear end view and side view, respectively, as deployed. Those skilled in the art recognize the short cylindrical skeletal structure characteristic of the deployable perimeter truss 3 constructed from various tubular members, referred to as truss members and/or longerons.

Figure 3:
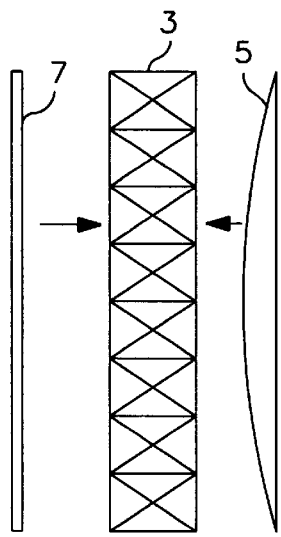
FIG. 3 pictorially illustrates the assembly of the components of the embodiment of FIG. 1.

Truss 3 supports a reflective mesh 5, which is pliant in characteristic and is reflective of microwave energy. The reflective mesh forms the reflector. The truss also supports a solar array 7. It is noted that, to better illustrate solar array 7, the truss is illustrated inverted in FIGS. 1 and 2 with its front end located at the bottom in FIG. 2 and its rear end, where solar array 7 is supported, being located at the top in the figure. As pictorially represented in the side view of FIG. 3, reflector 5 is attached to the front end of truss 3 and solar array 7 is located and attached to the truss's rear end.

Figure 4:
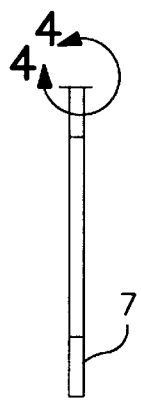
FIG. 4 is a side section view of the solar array component of the embodiment of FIG. 1.
Figure 5:
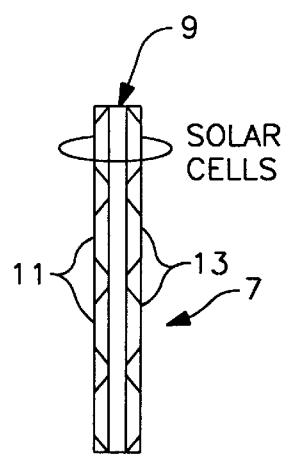
FIG. 5 is a partial section view thereof taken along lines 4—4 in FIG. 4, drawn to a larger scale.

As pictorially illustrated in side view in FIG. 4 and in the partial section view of FIG. 5, solar array 7 is formed of a base of pliant material 9, suitably a film material, such as found in the prior solar arrays. A large plurality of photovoltaic cells 11 and 13 attached to both the front and back sides of base 9.

The photovoltaic cells are electrically organized in strings as in the prior solar arrays, in series circuit to provide the appropriate voltage level desired, and, as in the prior solar arrays, the separate strings are arranged in parallel circuit to provide appropriate levels of current capacity that supplies appropriate charging levels when connected to the battery load on board the spacecraft which is somewhat flexible. Suitable photovoltaic cells for the present application may be constructed of amorphous silicon.

It is recognized that the present invention is not concerned with the details of the photovoltaic cells or their construction into solar arrays, which is available in the technical literature and need not be here described. As those skilled in the solar array art appreciate, the electrical connections for the circuits in the array are formed on the base as a trace, using familiar printed circuit technique, and being thus integral with the base can be flexed or bent. So too, the amorphous silicon photovoltaic cells.

Figure 6:
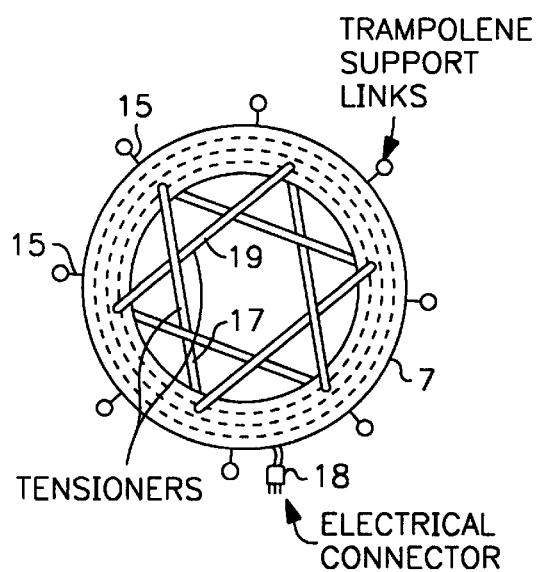
FIG. 6 illustrates the solar array component in top view as deployed.

In FIG. 1, the solar array 7 is in the shape of a thin annulus or washer-shape geometry. Its circular outer diameter is slightly less than the diameter of the truss. As shown in the pictorial of FIG. 6, wherein the solar array is illustrated in the deployed condition, a plurality of cords 15 are evenly spaced about and tied to the outer peripheral edge of the solar array. Those cords fasten the solar array to truss 3. When deployed, the truss pulls on those cords stretching the solar array taut.

To prevent the solar array from drooping or flapping along the circular inner periphery, a stretching device is used, a pair of cords 17 and 19. Each of the cords is threaded through holes located along the solar array's inner periphery. The holes are spaced equally about that periphery, and allow each cord to be formed into two identical equilateral triangles, forming a "Star of David". The cords allow the solar array to drape when the assembly is being folded into the stowed condition. When deployed, the stretching device pulls the inner peripheral edge taut, responsive to the truss pulling the attachment cords 15 taut. An electrical cable 18 is carried by the array to make the electrical connection to the charging system aboard the spacecraft.

Figure 7:
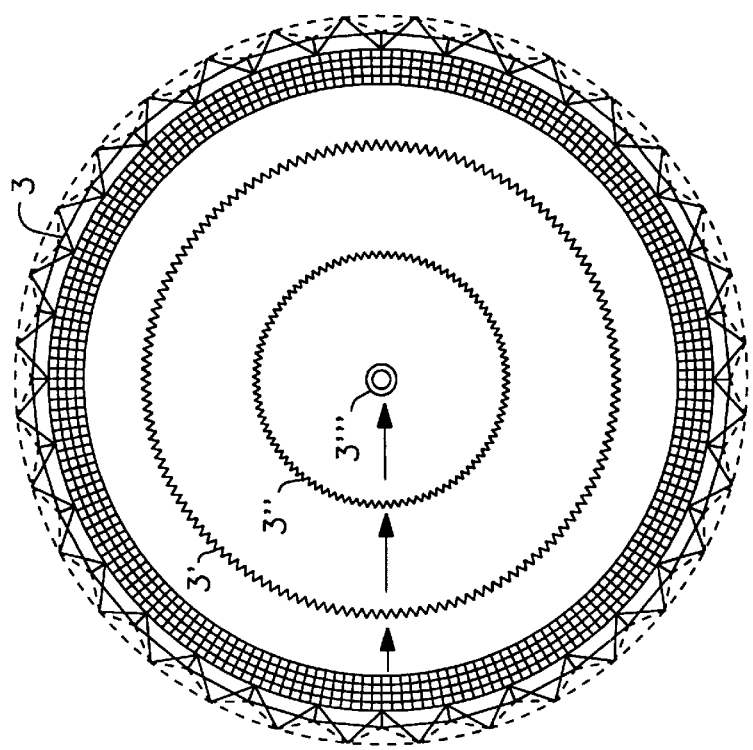
FIG. 7 pictorially illustrates folding the embodiment for stowage aboard a spacecraft.

Truss 1 is foldable. It's frame members are constructed with pivotal joints so that when the truss is to be stored, the members fold and/or pivot in unison in such a manner that the elements contract inwardly and, as viewed from an end define smaller and smaller circles, culminating in a circular ended barrel-like shape. One folding pattern of the solar arrays, would have the array panels fold accordion style such that they would collapse into a tight ring within the folded truss. As pictorially illustrated in top view in FIG. 7, during folding up, the truss 3, folds inwardly. The folding array is represented pictorially in stages 3', 3" culminating in the barrel like configuration of small diameter illustrated at 3'". The reflective mesh 7 drapes and folds in an accordion-like manner within that barrel-like shape, occupying approximately one half the height of the barrel as folded, and solar array 7 also drapes and folds within the barrel configuration.

As in the case of the solar array, the construction details of the perimeter truss and reflector and its folding operation are not illustrated or described in detail. It is recognized that the present invention is not concerned with the details of those known folding mechanisms and truss members or of the reflective mesh material, and are not necessary to an understanding of the present combination invention. For one example of such construction details, the interested reader may refer to the technical and patent literature on prior deployable perimeter truss reflectors, including U.S. Pat. No. 5,680,145 granted Oct. 21, 1997 to Thomson et al and to the pending application to Gilger and Parker, Ser. No. 09/080,767 filed May 18, 1998 now U.S. Pat. No. 6,028,570, entitled Folding Perimeter Truss Reflector, earlier cited in the background to this specification.

Figure 8:
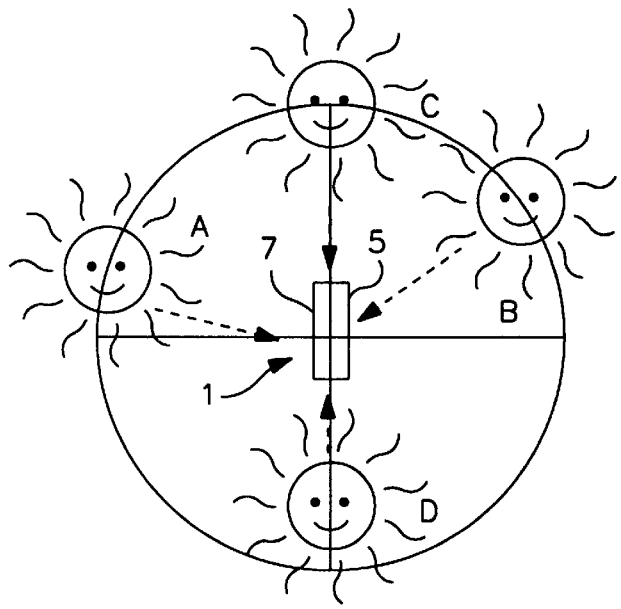
FIG. 8 is a pictorial that is helpful in understanding the operation of the embodiment.

In operation as deployed, the assembly receives light directly from the sun at all sun positions, except when the sun is directly perpendicular to the central axis of the reflector-solar array combination 1. As pictorially illustrated in FIG. 8, when sun is at any position A about the left hemisphere, the light radiation falls directly on one side of solar array 7. When the sun is at any position B in the right hemisphere, the sun is incident on the reflective mesh 5. However, the wires forming the mesh leave openings between the top and bottom surfaces of the mesh and light may pass through those openings. It may be shown that up to ninety per cent of the light that falls on the mesh, passes through. Hence, the mesh is said to be light permeable. When the sun is located at positions C or D, the direct light rays are directed to the peripheral edge of the array, and, hence, do not shine upon the solar cells in the array. However, even in this condition, the solar array may be exposed to the sun's rays indirectly, through reflection off of other planets or orbiting bodies.

It is appreciated that the foregoing combination integrates the RF reflector and the solar array into a single unitary structure. With hindsight, the novel combination is relatively simple to construct and apply. Given the teachings of the present invention, those skilled in the art may without undue experimentation easily access the details of known foldable perimeter truss reflectors and solar arrays and integrate the features of such separate technologies into the described combination.

In the foregoing embodiment, the solar array is washer-shaped in geometry, as it is believed that the number of solar cells that fit within that geometry should be sufficient in number to produce the desired electrical power. In other embodiments the washer annulus may be made wider to incorporate additional solar cells, as appropriate, or, if necessary, be formed into a complete circular disk. Other patterns covering this area may be used where it may provide better folding geometries.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A combined deployable RF reflector and solar array, comprising:
    a deployable perimeter truss, said truss as deployed defining a hollow cylinder having circular shaped open front and rear ends;
    a reflective material supported by said truss, said reflective material covering said front end and defining a concave parabolic shaped surface to said front end, said reflective material comprising a mesh, whereby light may pass through openings in said mesh;
    a pliant sheath, said pliant sheath having a predefined shape and area and supporting an array of photovoltaic cells to define a foldable assembly for a solar array, said sheath being supported by said truss at said rear end of said truss and within said circular shaped periphery of said rear end.

2. The invention as defined in claim 1, wherein said pliant sheath comprises a circular band of predetermined width; said band being connected about its outer periphery to the periphery to said circular shaped rear end of said truss.

3. The invention as defined in claim 1, wherein said sheath comprises a circle of predetermined diameter, said diameter being no greater in diameter than the diameter of said circular shaped rear end of said truss; said sheath being connected about its outer periphery to said rear end of said truss.

4. In combination in a unitary assembly a deployable perimeter truss, an RF reflective pliant mesh material and a pliant sheath containing an array of photovoltaic cells, said pliant mesh material defining with said truss a deployable reflector and said pliant sheath containing an array of photovoltaic cells defining with said truss a deployable solar array.

5. In combination:
    a foldable perimeter truss;
    a solar array, said solar array including a front side and a back side, and a plurality of solar cells on each of said front and back sides;
    a reflective surface, said reflective surface comprising a mesh and said mesh being light permeable; and
    each of said solar array and said reflective surface being supported on said foldable perimeter truss.

6. The invention as defined in claim 5, wherein said foldable perimeter truss includes a front end and a rear end; and wherein said reflective surface is supported at said front end and said solar array is supported at said rear end, whereby said reflective surface and said solar array are spaced apart on said foldable perimeter truss, and wherein light permeating said mesh is incident on a side of said solar array.

7. The invention as defined in claim 6, wherein said solar array comprises a washer-shaped geometry, having an outer circular periphery and an inner circular periphery; wherein said rear end of said foldable perimeter truss comprises a circular geometry;
    coupling means for coupling said outer circular periphery to said foldable perimeter truss, wherein said perimeter truss produces a radially outward force on said outer circular periphery on deployment to tauten said solar panel; and
    pliant stretching means coupled to said inner circular periphery of said solar array for producing a radially inward force on said inner circular periphery on deployment to tauten said solar panel.

* * * * *